(No Model.)
R. ATKIN.
PIPE WRENCH.
No. 464,238.
Patented Dec. 1, 1891.
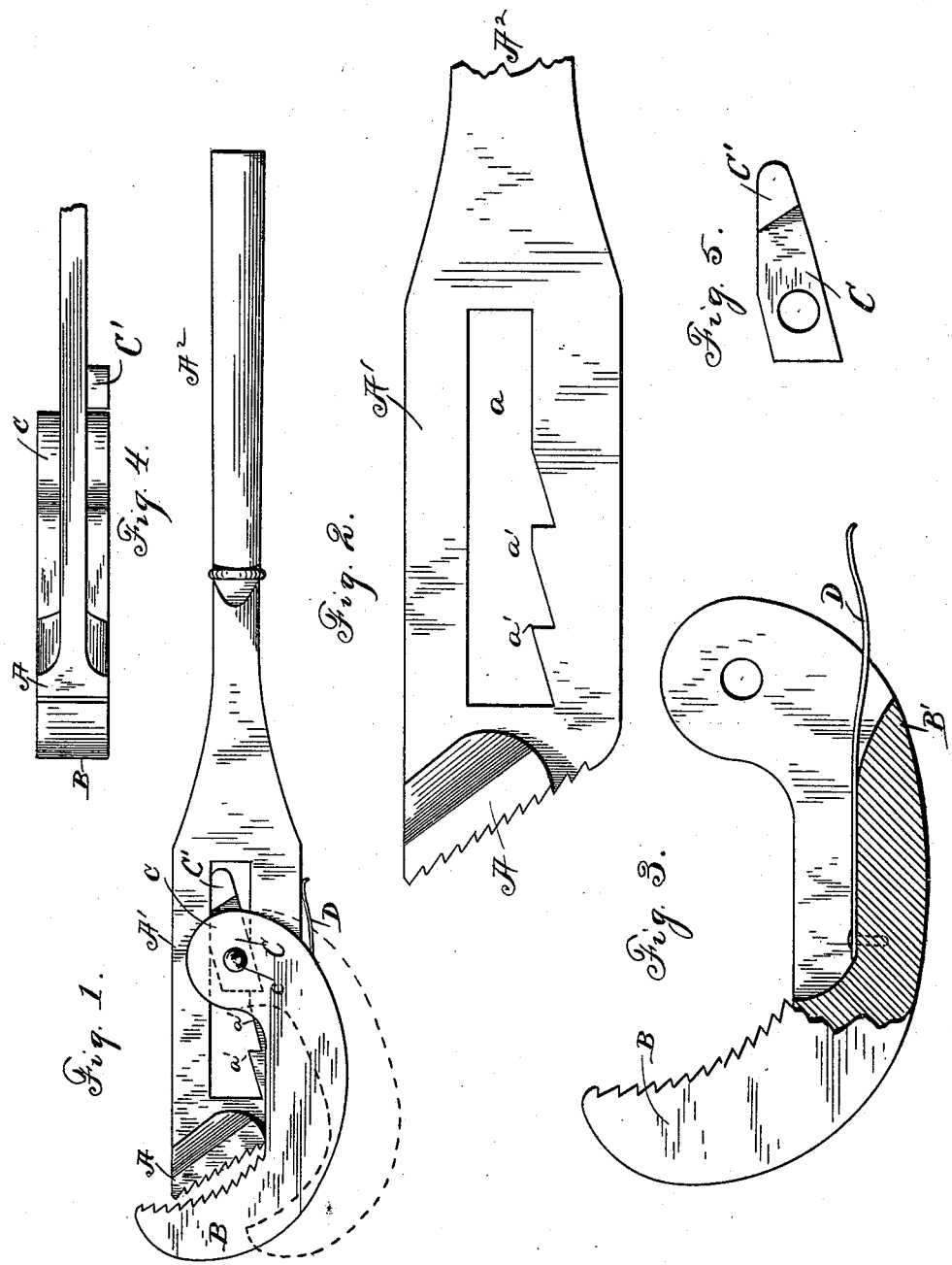
Witnesses.
E. Byron Gilchrist
Inventor.
Ralph Atkin

UNITED STATES PATENT OFFICE.

RALPH ATKIN, OF PAINESVILLE, OHIO.

PIPE-WRENCH.

SPECIFICATION forming part of Letters Patent No. 464,238, dated December 1, 1891.

Application filed June 17, 1891. Serial No. 396,571. (No model.)

*To all whom it may concern:*

Be it known that I, RALPH ATKIN, of Painesville, in the county of Lake and State of Ohio, have invented certain new and useful Improvements in Pipe-Wrenches; and I do hereby declare the following to be a full, clear, and exact description of the invention, such as will enable others skilled in the art to which it pertains to make and use the same.

My invention relates to improvements in pipe-wrenches; and it consists in certain features of construction and in combination of parts hereinafter described, and pointed out in the claims.

In the accompanying drawings, Figure 1 is a side elevation of a pipe-wrench embodying my invention. Fig. 2 is an enlarged side elevation of member A' detached. Fig. 3 is a side elevation, partly in section, of the movable jaw and connected spring. Fig. 4 is a plan. Fig. 5 is an enlarged elevation in detail of the dog.

A represents the stationary jaw of the wrench, and A' the shank that connects jaw A with the handle A². Shank A' is rectangular in cross-section and is provided with a transverse longitudinal slot $a$, the lower wall of the slot being provided with ratchet-teeth presenting rearward, or toward the handle, as at $a'$.

B represents the movable jaw, the shank B' whereof is bifurcated so that the prongs thereof embrace with an easy fit shank A'.

C is a dog pivoted at $c$ to and between the prongs of shank B', this dog operating in slot $a$ and the point of the dog being adapted to engage teeth $a'$, during which engagement the other end of the dog bears against the upper or opposing wall of slot $a$. The dog has a lateral thumb-piece C' projecting laterally, so that the free end thereof protrudes from slot $a$ to where it is easily operated by the thumb or finger of the operator. By depressing this thumb-piece the dog is tilted to disengage the dog from teeth $a'$, in which position of parts dog B can be moved forward by hand so as to open the wrench. In reversing jaw B by hand it is not necessary to manipulate the dog, as this member will be snubbed back by its engagement with the ratchet-teeth. In operating the wrench the tendency is to draw the jaws apart by their engagement with the work—that is, to move jaw B forward, and such forward movement of the jaw is of course prevented by the action of the dog. Teeth $a'$ are usually arranged—that is, located and spaced—so that the jaws will accommodate themselves to different standard sizes of pipe; but of course for special work these teeth may be arranged as required. From the fact that the draft on the fulcrum of the dog is approximately in line with the points of contact as between the pipe and the respective jaws there is much less liability of bending or straining the parts than where the ratchet-teeth are at the external top or bottom of shank A, as heretofore commonly arranged. A flat spring D is secured to shank B' between the prongs of the latter, this spring extending rearward and engaging the under side of shank A', this spring acting in the direction to close the jaws upon the work. As this spring is attached to and moves with the movable jaw, its leverage and action on this jaw is always the same, regardless the position forward or back of the jaw. Heretofore this spring has usually been fastened to shank A', and hence when the jaws are opened wide for receiving a large pipe this spring, by acting on a short leverage of the movable jaw, closed the jaw with less force than it would on a small pipe, in which latter case the movable jaw, being moved rearward, the spring would overlap the jaw and engage it at a greater distance from the fulcrum of the jaw.

What I claim is—

1. In a pipe-wrench, in combination, stationary and movable jaws, the shank of the latter being forked so as to embrace the shank of the former, the shank of the stationary jaw being slotted, the under wall of such slot having ratchet-teeth, and a dog pivoted to and between the prongs of the movable jaw, such dog being operative within the slot of the shank of the stationary jaw, substantially as set forth.

2. In a pipe-wrench, in combination, a movable jaw having prongs for embracing the shank of the stationary jaw, the latter having a slot with ratchet-teeth, a dog pivoted between the prongs of the movable jaw, such dog operating in such slot, and a spring fastened to the movable jaw, such spring extending rearward, the free end of the spring engaging the under side of the shank of the stationary jaw, substantially as set forth.

In testimony whereof I sign this specification, in the presence of two witnesses, this 21st day of May, 1891.

RALPH ATKIN.

Witnesses:
C. H. DORER,
WARD HOOVER.